United States Patent
Shaffer et al.

(10) Patent No.: US 7,421,854 B2
(45) Date of Patent: Sep. 9, 2008

(54) AUTOMATIC START/STOP SEQUENCING CONTROLS FOR A STEAM TURBINE POWERED CHILLER UNIT

(75) Inventors: Dennis Lee Shaffer, Thomasville, PA (US); Russell Mark Thompson, York, PA (US)

(73) Assignee: York International Corporation, York, PA (US)

(*) Notice: Subject to any disclaimer, the term of this patent is extended or adjusted under 35 U.S.C. 154(b) by 523 days.

(21) Appl. No.: 11/016,222

(22) Filed: Dec. 17, 2004

(65) Prior Publication Data

US 2005/0160750 A1    Jul. 28, 2005

Related U.S. Application Data

(60) Provisional application No. 60/539,014, filed on Jan. 23, 2004.

(51) Int. Cl.
F25B 1/06    (2006.01)

(52) U.S. Cl. ............ 62/500; 62/228.5; 62/228.4; 62/231; 60/239; 60/646

(58) Field of Classification Search .......... 62/500, 62/228.5, 228.4, 231; 60/239, 646
See application file for complete search history.

(56) References Cited

U.S. PATENT DOCUMENTS

| | | | |
|---|---|---|---|
| 2,803,192 A | 8/1957 | Crabtree | |
| 3,276,218 A * | 10/1966 | Leonard, Jr. | 62/116 |
| 3,301,000 A * | 1/1967 | Holbay | 62/141 |
| 3,513,662 A | 5/1970 | Golber | |
| 3,552,872 A * | 1/1971 | Giras et al. | 415/17 |
| 3,643,437 A * | 2/1972 | Birnbaum et al. | 60/646 |
| 3,744,932 A | 7/1973 | Prevett | |
| 3,959,635 A | 5/1976 | Tanco | |
| 4,084,406 A | 4/1978 | Brenneman | |
| 4,151,725 A | 5/1979 | Kountz et al. | |
| 4,152,902 A | 5/1979 | Lush | |
| 4,248,055 A | 2/1981 | Day, III et al. | |
| 4,272,012 A | 6/1981 | Molnar et al. | |
| 4,282,718 A | 8/1981 | Kountz et al. | |
| 4,329,592 A * | 5/1982 | Wagner et al. | 290/40 R |
| 4,455,614 A | 6/1984 | Martz et al. | |
| 4,497,031 A | 1/1985 | Froehling et al. | |
| 4,562,531 A | 12/1985 | Enterline et al. | |
| 4,614,089 A | 9/1986 | Dorsey | |
| 4,970,870 A | 11/1990 | Midlang et al. | |

(Continued)

FOREIGN PATENT DOCUMENTS

EP    0 186 332 A1    7/1986

(Continued)

*Primary Examiner*—Cheryl J. Tyler
*Assistant Examiner*—John Pettitt
(74) *Attorney, Agent, or Firm*—McNees Wallace & Nurick, LLC

(57) ABSTRACT

A control system and method are provided for the automatic startup and shutdown of a steam turbine driven chiller unit. The chiller unit includes an integrated central control panel to control operation of both the steam turbine system and the refrigerant system. The central control panel has a startup control system to automatically start the steam turbine driven chiller unit while performing necessary protective actions and a shutdown control system to automatically stop the steam turbine driven chiller unit while performing necessary protective actions.

21 Claims, 7 Drawing Sheets

U.S. PATENT DOCUMENTS

| | | | |
|---|---|---|---|
| RE33,620 E | 6/1991 | Persem | |
| 5,097,405 A | 3/1992 | Sato | |
| 5,222,370 A | 6/1993 | James | |
| 5,355,691 A | 10/1994 | Sullivan et al. | |
| 5,367,888 A | 11/1994 | Muston et al. | |
| 5,553,997 A | 9/1996 | Goshaw et al. | |
| 5,628,199 A | 5/1997 | Hoglund et al. | |
| 5,651,264 A | 7/1997 | Lo et al. | |
| 5,669,225 A | 9/1997 | Beaverson et al. | |
| 5,748,500 A * | 5/1998 | Quentin et al. | 702/182 |
| 5,798,941 A | 8/1998 | McLeister | |
| 6,026,651 A | 2/2000 | Sandelman | |
| 6,050,083 A | 4/2000 | Meckler | |
| 6,179,214 B1 | 1/2001 | Key et al. | |
| 6,202,431 B1 | 3/2001 | Beaverson et al. | |
| 6,427,464 B1 | 8/2002 | Beaverson et al. | |
| 6,453,687 B2 | 9/2002 | Sharood et al. | |
| 6,463,740 B1 | 10/2002 | Schmidt et al. | |
| 6,481,978 B2 | 11/2002 | Zamalis et al. | |
| 6,581,399 B2 | 6/2003 | Benedict et al. | |
| 6,658,870 B1 | 12/2003 | Jenkins | |
| 6,679,071 B1 | 1/2004 | Storey et al. | |
| 2002/0193890 A1 | 12/2002 | Pouchak | |
| 2003/0140637 A1 | 7/2003 | Masui et al. | |
| 2003/0195640 A1 | 10/2003 | Krocker et al. | |

FOREIGN PATENT DOCUMENTS

| | | |
|---|---|---|
| EP | 0 366 219 A2 | 5/1990 |
| EP | 0 525 612 A1 | 2/1993 |
| EP | 0 573 827 A2 | 12/1993 |
| EP | 0 593 225 A1 | 4/1994 |
| EP | 0 910 015 A1 | 4/1999 |
| JP | 58-184601 | 10/1983 |
| JP | 59-30116 | 2/1984 |
| JP | 4-225723 | 8/1992 |
| JP | 5-35449 | 2/1993 |
| JP | 2000 20111 | 1/2000 |
| WO | WO 97/38270 | 10/1997 |
| WO | WO 99/54628 | 10/1999 |
| WO | WO 00/48376 | 8/2000 |
| WO | WO 03/090000 A1 | 10/2003 |

\* cited by examiner

AUTOMATIC START/STOP SEQUENCING CONTROLS FOR A STEAM TURBINE POWERED CHILLER UNIT

CROSS REFERENCE TO RELATED APPLICATIONS

This application claims the benefit of U.S. Provisional Application No. 60/539,014, filed Jan. 23, 2004.

BACKGROUND OF THE INVENTION

The present invention relates generally to a control system for a chiller unit, and more specifically, to a control system for a steam turbine powered chiller unit that can automatically start and stop the steam turbine powered chiller unit.

While most heating, ventilation and air conditioning (HVAC), refrigeration, or chiller systems use electric motors to power the corresponding compressor(s) in the chiller system, some chiller systems can use a steam turbine to power the compressor. Typically, these steam turbine powered chiller systems have required an excessive amount of fieldwork to install and connect the chiller system to the steam turbine system. Some previous steam turbine driven chiller units or systems have involved the packaging of the steam turbine on the chiller unit and resulted in unique installations requiring field routed piping and instrumentation to link the steam turbine system with the chiller unit to complete the installation.

In these previous steam turbine driven chillers systems, many of the controls used with the steam turbine and the chiller unit, e.g., steam turbine governor control, pre-rotation vane control, hot gas control, turbine torque limitation control and surge prevention control, were "stand alone" controls that operated independently of the other controls and did not communicate with the other controls. The use of these separate controls resulted in difficult and complex manual startup and shutdown procedures, as an operator of the steam turbine driven chiller unit had to monitor all of the separate controls and then initiate the appropriate actions on the appropriate controls at the appropriate times to avoid damaging the steam turbine driven chiller unit or having an unnecessary shutdown of the steam turbine driven chiller unit. In addition, the use of these separate controls results in the requirement that the control operations for the steam turbine system be coordinated with the control operations for the chiller unit for a proper startup or shutdown of the steam turbine chiller unit.

An operator of a steam turbine driven chiller system had to perform the following manual operations for starting up or shutting down the steam turbine driven chiller system. During startup, ensure that the turbine casing drain valve is open and then manually open the steam inlet slow roll bypass valve to begin the slow roll warm-up of the turbine. While the turbine is slow rolling, open the gland sealing steam supply valve. After the turbine is warmed up and the vacuum pump started, close the turbine casing drain valve. When the exhaust is evacuated sufficiently for a ramp up to rated speed, open the main steam inlet block valve rapidly enough to ensure that adequate steam is available to increase the speed rapidly through the critical speed band of the turbine to avoid excess vibration. When the chiller is running at rated speed, close the main steam inlet slow roll bypass valve. After any shutdown, close the main steam inlet block valve and the gland sealing steam supply valve and open the turbine casing drain valve.

Therefore, what is needed is a control system for a steam turbine powered chiller unit that can automatically startup and shutdown the steam turbine powered chiller unit.

SUMMARY OF THE INVENTION

One embodiment of the present invention is directed to a method of automatically starting a steam turbine driven chiller system in response to entry of a single command by an operator. The method including the steps of executing a steam turbine start sequence, executing a steam turbine slow roll mode operation, and executing a steam turbine acceleration process to accelerate the steam turbine to an operational speed. The steps of executing a steam turbine start sequence, executing a steam turbine slow roll mode operation, and executing a steam turbine acceleration process are completed by a control program without additional action by an operator.

Another embodiment of the present invention is directed to a method of automatically shutting down a chiller system driven by a steam turbine in response to entry of a single command by an operator. The method includes the steps of decreasing an operating speed of the steam turbine to a predetermined minimum turbine speed, closing pre-rotation vanes in the chiller system to a predetermined minimum vane position, and opening a hot gas bypass valve in the chiller system toward a fully open position. The method also includes executing a shutdown process for the steam turbine upon the completion of the steps of decreasing an operating speed of the steam turbine, closing pre-rotation vanes, and opening a hot gas bypass valve. The steps of decreasing an operating speed of the steam turbine, closing pre-rotation vanes, opening a hot gas bypass valve, and executing a shutdown process for the steam turbine are completed by a control program without additional action by an operator.

Still another embodiment of the present invention is directed to a chiller system having a steam system including a steam supply, a steam turbine and a steam condenser connected in a steam loop and a refrigerant system including a compressor, a refrigerant condenser, and an evaporator connected in a refrigerant loop. The compressor is driven by the steam turbine. The chiller system also includes a central control panel to control operation of both the steam system and the refrigerant system. The central control panel having a startup control system to automatically start the steam system and the refrigerant system and a shutdown control system to automatically shutdown the steam system and the refrigerant system.

One advantage of the present invention is that a steam turbine driven chiller system can be remotely started or stopped.

Another advantage of the present invention is that a chiller plant with a steam turbine driven chiller system can be fully automated.

Still another advantage of the present invention is a central control system that utilizes the full range of controls for the steam turbine driven chiller system to automatically startup or shutdown the chiller system while preventing unsafe operation of the chiller system.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
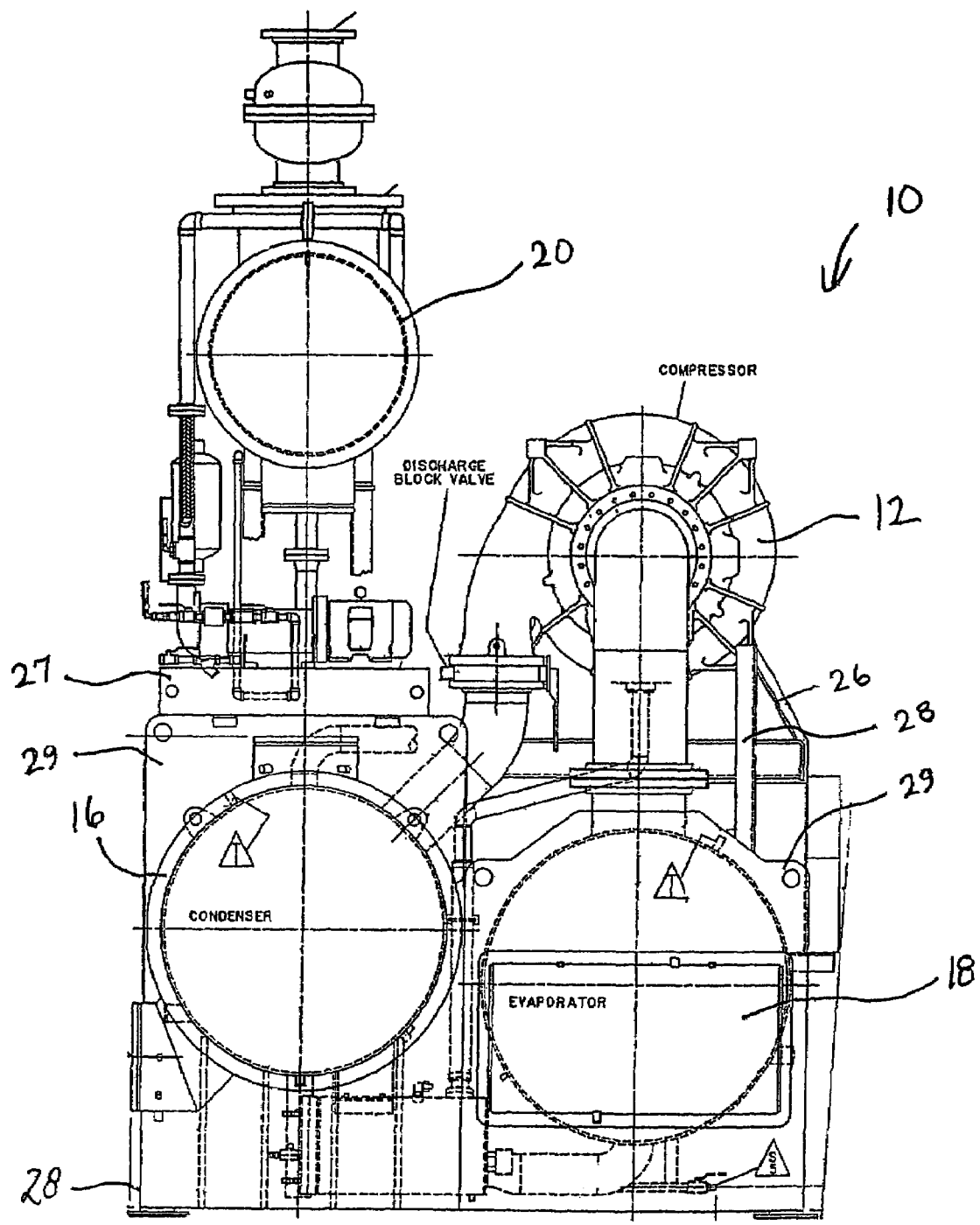
FIG. 1 is a side view of a chiller unit of the present invention.
Figure 2:
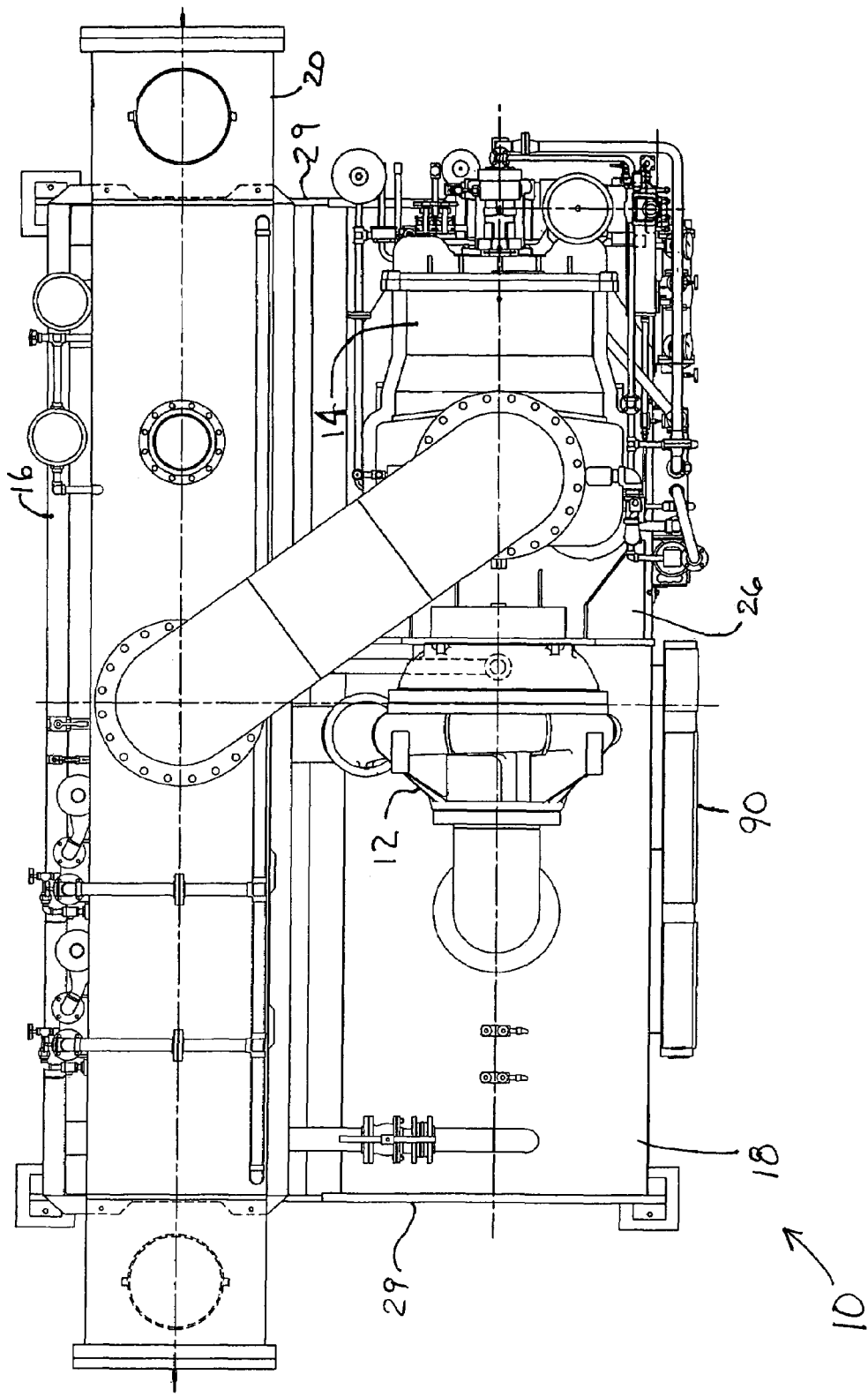
FIG. 2 is a top view of the chiller unit of FIG. 1.
Figure 3:
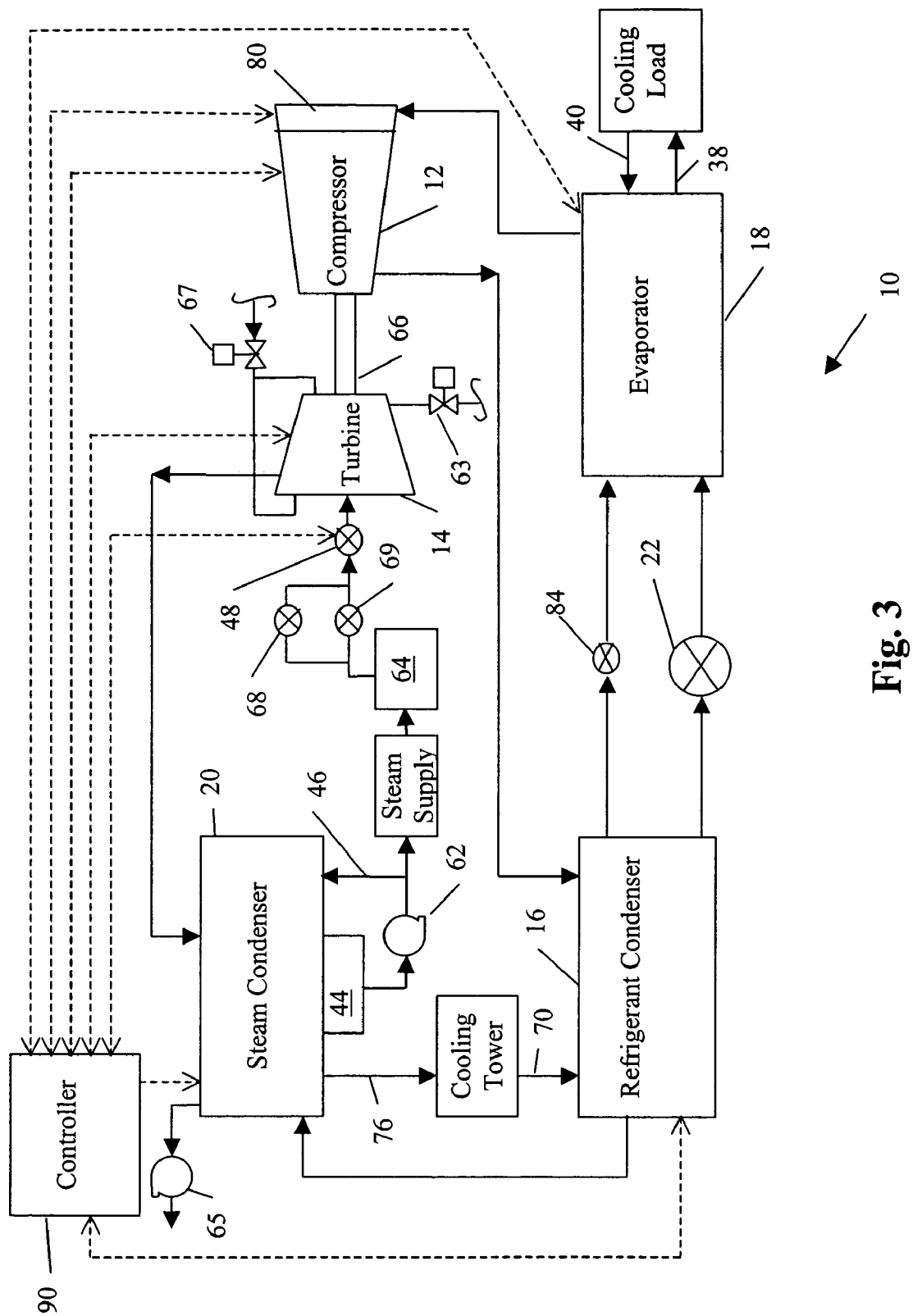
FIG. 3 is a schematic representation of the chiller unit of FIG. 1.

A general system to which the invention is applied is illustrated, by means of example, in FIGS. 1-3. As shown, the HVAC, refrigeration, or chiller system 10 includes a compressor 12, a steam turbine 14, a refrigerant condenser 16, a water chiller or evaporator 18, a steam condenser 20, an expansion device 22 and a control panel or controller 90. The operation of the control panel 90 will be discussed in greater detail below. The chiller system 10 further includes a compressor lubrication system (not shown) and a turbine lubrication system (not shown). The conventional liquid chiller system 10 includes many other features that are not shown in FIGS. 1-3. These features have been purposely omitted to simplify the drawing for ease of illustration.

In a preferred embodiment, a "structural frame" permits the stacking or vertical arrangement of major components of the chiller system 10 to provide a prepackaged unit that occupies less floor space with a smaller footprint than a field fabricated unit where the components are arranged horizontally. The structural frame can include a turbine baseplate 26, a steam condenser baseplate 27, a plurality of frame members 28, and tube end sheets 29. Tube end sheets 29 can provide both the internal support and refrigerant/water separation for the ends of heat exchange tubes (not shown) within refrigerant condenser 16 and evaporator 18. Frame members 28 are preselected structural components and materials, such as plate steel and tubular supports, that can support the corresponding components of the chiller system 10. The mounting between compressor 12 and turbine baseplate 26 is preferably a conventional D-flange coupling device that rigidly interconnects the housing of compressor 12 with turbine baseplate 26. In addition, the D-flange coupling device can afford a predictable degree of shaft alignment for the compressor 12 and the steam turbine 14.

In one embodiment of the present invention, the structural frame incorporates a steam turbine 14 in combination with a refrigerant condenser 16, evaporator 18 and compressor 12 into a pre-packaged unit for installation. The steam condenser 20 and steam condenser baseplate 27 are preferably manufactured as a separate unit from the pre-packaged unit and include all necessary interconnections for connection to the pre-packaged unit. The steam condenser 20 and steam condenser baseplate 27 can be field installed above the refrigerant condenser 16 during installation of chiller system 10.

In the chiller system 10, the compressor 12 compresses a refrigerant vapor and delivers it to the refrigerant condenser 16. The compressor 12 is preferably a centrifugal compressor, however any other suitable type of compressor can be used. The compressor 12 is driven by the steam turbine 14, which steam turbine 14 can drive the compressor 12 at either a single speed or at variable speeds. Preferably, steam turbine 14 is a multistage, variable speed turbine that is capable of operating compressor 12 at a speed that more closely optimizes the efficiency of the chiller system 10. More preferably, steam turbine 14 is capable of driving compressor 12 at speeds in a range of about 3200 rpm to about 4500 rpm. The supply of steam to the steam turbine 14 is preferably dry saturated steam within a range of about 90 to about 200 psi. The flow of steam supplied to steam turbine 14 can be modulated by a governor 48 to vary the speed of the steam turbine 14, and therefore vary the speed of compressor 12 to adjust the capacity of the compressor by providing a greater or higher or a lower or lesser amount of refrigerant volumetric flow through the compressor 12. In another embodiment, the steam turbine 14 can drive the compressor at only a single speed and other techniques are needed to adjust the capacity of the compressor 12, e.g., the use of pre-rotation vanes 80 and/or a hot gas bypass valve 84.

The refrigerant vapor delivered by the compressor 12 to the refrigerant condenser 16 enters into a heat exchange relationship with a fluid, e.g., air or water, and undergoes a phase change to a refrigerant liquid as a result of the heat exchange relationship with the fluid. In a preferred embodiment, the refrigerant vapor delivered to the refrigerant condenser 16 enters into a heat exchange relationship with a fluid, preferably water, flowing through a heat-exchanger coil connected to a cooling tower. The refrigerant vapor in the refrigerant condenser 16 undergoes a phase change to a refrigerant liquid as a result of the heat exchange relationship with the fluid in the heat-exchanger coil. The condensed liquid refrigerant from refrigerant condenser 16 flows through an expansion device 22 to the evaporator 18.

The evaporator 18 can include a heat-exchanger coil having a supply line 38 and a return line 40 connected to a cooling load. A secondary liquid, e.g., water, ethylene or propylene glycol mixture, calcium chloride brine or sodium chloride brine, travels into the evaporator 18 via the return line 40 and exits the evaporator 18 via the supply line 38. The liquid refrigerant in the evaporator 18 enters into a heat exchange relationship with the secondary liquid to lower the temperature of the secondary liquid. The refrigerant liquid in the evaporator 18 undergoes a phase change to a refrigerant vapor as a result of the heat exchange relationship with the secondary liquid. The vapor refrigerant in the evaporator 18 exits the evaporator 18 and returns to the compressor 12 by a suction line to complete the cycle. It is to be understood that any suitable configuration of refrigerant condenser 16 and evaporator 18 can be used in the chiller system 10, provided that the appropriate phase change of the refrigerant in the refrigerant condenser 16 and evaporator 18 is obtained.

At the input or inlet to the compressor 12 from the evaporator 18, there are one or more pre-rotation vanes (PRV) or inlet guide vanes 80 that control the flow of refrigerant to the compressor 12, and thereby control the capacity of the compressor 12. Pre-rotation vanes 80 are positionable to any position between a substantially open position, wherein refrigerant flow is essentially unimpeded into compressor 12, and a substantially closed position, wherein refrigerant flow into compressor 12 is restricted. It is to be understood that in the closed position, pre-rotation vanes 80 may not completely stop the flow of refrigerant into compressor 12. An actuator is used to open the pre-rotation vanes 80 to increase the amount of refrigerant to the compressor 12 and thereby increase the cooling capacity of the system 10. Similarly, the actuator is used to close the pre-rotation vanes 80 to decrease the amount of refrigerant to the compressor 12 and thereby decrease the cooling capacity of the system 10. The actuator for the pre-rotation vanes 80 can open and close the pre-rotation vanes 80 in either a continuous manner or in a stepped or incremental manner.

The chiller system 10 can also include a hot gas bypass connection and corresponding valve 84 that connects the high pressure side and the low pressure side of the chiller system 10. In the embodiment illustrated in FIG. 3, the hot gas bypass connection and hot gas bypass valve 84 connect the refrigerant condenser 16 and the evaporator 18 and bypass the expansion device 22. In another embodiment, the hot gas bypass connection and hot gas bypass valve 84 can connect the compressor suction line and the compressor discharge line. The hot gas bypass valve 84 is preferably used as a recirculation line for compressor 12 to recirculate refrigerant gas from the discharge of compressor 12, via refrigerant condenser 16, to the suction of compressor 12, via evaporator 18. The hot gas bypass valve 84 can be adjusted to any position between a substantially open position, wherein refrigerant flow is essentially unimpeded, and a substantially closed position, wherein refrigerant flow is restricted. The hot gas bypass valve 84 can be opened and closed in either a continuous manner or in a stepped or incremental manner. The opening of the hot gas bypass valve 84 can increase the amount of refrigerant gas supplied to the compressor suction to prevent surge conditions from occurring in compressor 12.

With regard to the steam turbine system, a steam supply provides steam to the steam turbine 14. The steam from the steam supply preferably enters a moisture separator 64. In the moisture separator 64, moisture-laden steam from the steam supply enters and is deflected in a centrifugally downward motion. The entrained moisture in the steam is separated out by a reduction in the velocity of the steam flow. Separated moisture then falls through a moisture outlet (not shown) and dry saturated steam flows upward and exits through a steam outlet (not shown) where it flows toward a main steam inlet block valve 69 and a steam inlet slow roll bypass valve 68. The controller 90 automatically positions these valves to control the amount of steam that flows toward a governor 48 during the slow roll ramp up to minimum rated speed at start up. The governor 48 is located in the steam supply line to regulate steam flow and is preferably located adjacent a steam inlet of steam turbine 14. The governor or governor valve 48 can be opened or closed in a continuous manner or in a stepped or incremental manner. Steam turbine 14 includes a steam inlet to receive the steam from the steam supply. The steam from the steam supply flows through the steam inlet and turns a rotatable turbine portion of the steam turbine 14 to extract the energy therefrom to turn a coupler 66 that interconnects the shafts (not shown) of steam turbine 14 and compressor 12. After rotating the turbine portion of the steam turbine 14, the steam then exits the steam turbine 14 through a steam exhaust.

In a preferred embodiment, the coupler 66 provides for a direct rotational connection between the steam turbine 14 and the compressor 12. In alternate embodiments, the coupler 66 can include one or more gearing arrangements (or other similar arrangements) to increase or decrease the relative rotational speeds between the steam turbine 14 and the compressor 12. In addition, one or both of the steam turbine 14 and compressor 12 can also include an internal gearing arrangement connected to the coupler 66 to adjust the relative rotational speeds of the steam turbine 14 or compressor 12.

In addition, a turbine steam ring drain solenoid valve 63 is provided to automatically remove any condensate from the steam turbine 14 during the slow roll warm up of the steam turbine 14. A gland seal steam supply solenoid valve 67 is provided to automatically admit steam to the gland seal supply pressure regulating valve during a slow roll. A steam condenser vacuum pump 65 evacuates the steam condenser and turbine exhaust to a desired vacuum that is required for the steam turbine 14 to produce the power required by the compressor 12.

The exhausted steam from steam turbine 14 flows to steam condenser 20. Within steam condenser 20, the steam/condensate flow from the steam turbine 14 enters into a heat exchange relationship with cooling water flowing through steam condenser 20 to cool the steam. Steam condenser 20 includes a hotwell 44 connected to a condensate recirculation system 46. Condensate recirculation system 46 includes a condensate outlet in the hotwell 44 that can provide or transfer condensate from the hotwell 44 to a condensate pump 62. From the condensate pump 62, the condensate is selectively provided to a condensate recirculation inlet of the steam condenser 20 and/or to a condensate return inlet of the steam supply. In this manner, condensate recirculation system 46 can maintain a preselected flow of condensate through steam condenser 20 and return condensate to the steam supply for further generation of steam.

As discussed above, cooling water from a cooling tower or other source, is preferably routed to the refrigerant condenser 16 by a cooling water supply line 70. The cooling water is circulated in the refrigerant condenser 16 to absorb heat from the refrigerant gas. The cooling water then exits the refrigerant condenser 16 and is routed or provided to the steam condenser 20. The cooling water is circulated in the steam condenser 20 to further absorb heat from the steam exhausted from the steam turbine 14. The cooling water flowing from the steam condenser 20 is directed to the cooling tower by a cooling water return line 76 to reduce the temperature of the cooling water, which then may be returned to refrigerant condenser 16 to repeat the cycle.

Typically, the steam condenser 20 operates at a greater temperature than the refrigerant condenser 16. By routing the cooling water through refrigerant condenser 16 and then the steam condenser 20, in a series or serial arrangement, the low temperature cooling water can absorb heat within the refrigerant condenser 16 then be transferred to the steam condenser 20 to absorb additional heat. In a preferred embodiment, this ability to use the cooling water to cool both the refrigerant condenser 16 and the steam condenser 20 can be accomplished by selecting the appropriate refrigerant condenser 16 and steam condenser 20. The refrigerant condenser 16 is selected such that the outlet cooling water temperature from the refrigerant condenser 16 is lower than the maximum acceptable inlet cooling water temperature for the steam condenser 20. This series or serial flowpath for condenser (refrigerant and steam) cooling water within the chiller system 10 can reduce the need for multiple supplies of cooling water, and can reduce the total amount of cooling water required for the chiller system.

Figure 4:
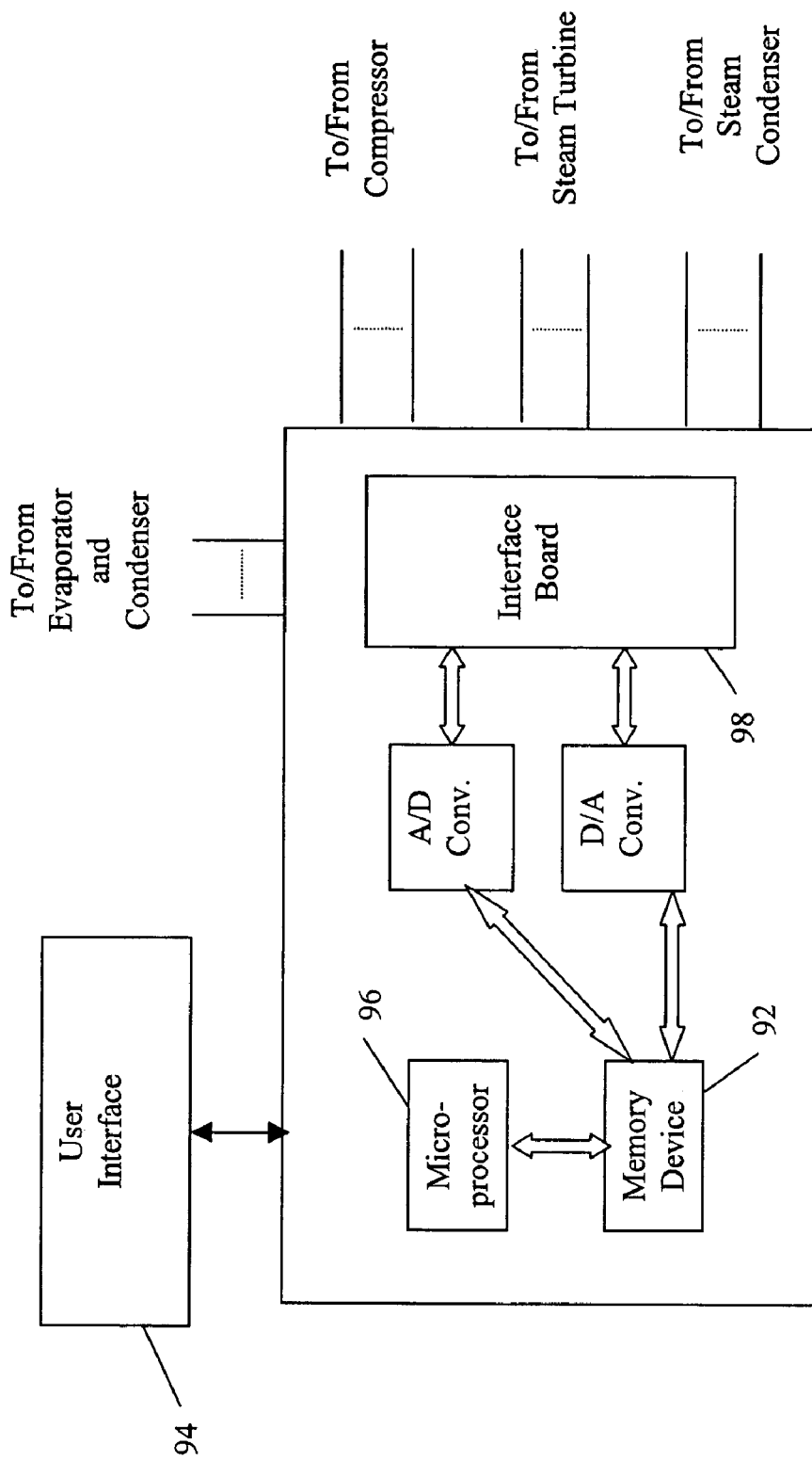
FIG. 4 is a schematic representation of the control system of the chiller unit of FIG. 1.

As illustrated in FIG. 4, the control panel 90 includes analog to digital (A/D) and digital to analog (D/A) converters, a microprocessor 96, a non-volatile memory or other memory device 92, and an interface board 98 to communicate with various sensors and control devices of chiller system 10. In addition, the control panel 90 can be connected to or incorporate a user interface 94 that permits an operator to interact with the control panel 90. The operator can select and enter commands for the control panel 90 through the user interface 94. In addition, the user interface 94 can display messages and information from the control panel 90 regarding the operational status of the chiller system 10 for the operator. The user interface 94 can be located locally to the control panel 90, such as being mounted on the chiller system 10 or the control panel 90, or alternatively, the user interface 94 can be located remotely from the control panel 90, such as being located in a separate control room apart from the chiller system 10.

Microprocessor 96 executes or uses a single or central control algorithm or control system to control the chiller system 10 including the compressor 12, the steam turbine 14, the steam condenser 20 and the other components of the chiller system 10. In one embodiment, the control system can be a computer program or software having a series of instructions executable by the microprocessor 96. In another embodiment, the control system may be implemented and executed using digital and/or analog hardware by those skilled in the art. In still another embodiment, control panel 90 may incorporate multiple controllers, each performing a discrete function, with a central controller that determines the outputs of control panel 90. If hardware is used to execute the control algorithm, the corresponding configuration of the control panel 90 can be changed to incorporate the necessary components and to remove any components that may no longer be required.

The control panel 90 of the chiller system 10 can receive many different sensor inputs from the components of the chiller system 10. Some examples of sensor inputs to the control panel 90 are provided below, but it is to be understood that the control panel 90 can receive any desired or suitable sensor input from a component of the chiller system 10. Some inputs to the control panel 90 relating to the compressor 12 can be from a compressor discharge temperature sensor, a compressor oil temperature sensor, a compressor oil supply pressure sensor and a pre-rotation vane position sensor. Some inputs to the control panel 90 relating to the steam turbine 14 can be from a turbine shaft end bearing temperature sensor, a turbine governor end bearing temperature sensor, a turbine inlet steam temperature sensor, a turbine inlet steam pressure sensor, a turbine first stage steam pressure sensor, a turbine exhaust pressure sensor, a turbine speed sensor, and a turbine trip valve status sensor.

Some inputs to the control panel 90 relating to the steam condenser 20 can be from a hotwell condensate level sensor, a hotwell high level status sensor, and a hotwell low level status sensor. Some inputs to the control panel 90 relating to the refrigerant condenser 16 can be from an entering refrigerant condenser water temperature sensor, a leaving condenser water temperature sensor, a refrigerant liquid temperature sensor, a refrigerant condenser pressure sensor, a subcooler refrigerant liquid level sensor, and a refrigerant condenser water flow sensor. Some inputs to the control panel 90 relating to the evaporator 18 can be from a leaving chilled liquid temperature sensor, a return chilled liquid temperature sensor, an evaporator refrigerant vapor pressure sensor, a refrigerant liquid temperature sensor, and a chilled water flow sensor. In addition, other inputs to controller 90 include a HVAC&R demand input from a thermostat or other similar temperature control system.

Furthermore, the control panel 90 of the chiller system 10 can provide or generate many different control signals for the components of the chiller system 10. Some examples of control signals from the control panel 90 are provided below, but it is to be understood that the control panel 90 can provide any desired or suitable control signal for a component of the chiller system 10. Some control signals from the control panel 90 can include a turbine shutdown control signal, a compressor oil heater control signal, a variable speed oil pump control signal, a turbine governor valve control signal, a hotwell level control signal, a hot gas bypass valve control signal, a subcooler refrigerant liquid level control signal, a pre-rotation vane position control signal, and a steam inlet valve control signal. In addition, control panel 90 can send a turbine shutdown signal when either the technician has input a shutdown command into user interface 94, or when a deviation is detected from a preselected parameter recorded in memory device 92.

The central control algorithm executed by the microprocessor 96 on the control panel 90 preferably includes a startup control program or algorithm to control the automatic startup of the steam turbine 14 and compressor 12. The startup control program and the integration of controls in control panel 90 provides for additional protections for individual components in the event of an off-design operating condition in steam turbine 14 or the chiller system 10. The startup control program provides automatic shutdown logic and protective functions to protect the chiller system 10 during operation. These protective functions include a pre-lubrication for compressor 12 and steam turbine 14 to ensure that adequate lubrication is provided prior to rotating compressor 12 and steam turbine 14. As detailed below, these protective systems also include a time sharing for redundant equipment such as hotwell pumps and vacuum pumps, wherein equipment are selectively operated in an alternate fashion to provide greater long term reliability.

In addition, the central control algorithm can maintain selected parameters of chiller system 10 within preselected ranges. These parameters include turbine speed, chilled liquid outlet temperature, turbine power output, and anti-surge limits for minimum compressor speed and compressor pre-rotation vane position. The central control program employs continuous feedback from sensors monitoring various operational parameters described herein to continuously monitor and change the speed of turbine 14 and compressor 12 in response to changes in system cooling loads.

The central control algorithm also includes other algorithms and/or software that provide the control panel 90 with a monitoring function of various operational parameters for chiller system 10 during both startup and routine operation of chiller system 10. Undesirable operational parameters, such as low turbine speed, low turbine oil pressure, or low compressor oil pressure, can be programmed into the control panel 90 with a logic function to shutdown the chiller system 10 in the event that undesired, or beyond system design, parameters are detected. Additionally, the central control algorithm has preselected limits for many of the operational parameters of the chiller system 10 and can prevent a technician from manually operating the chiller system 10 outside of these limits.

Figure 5:
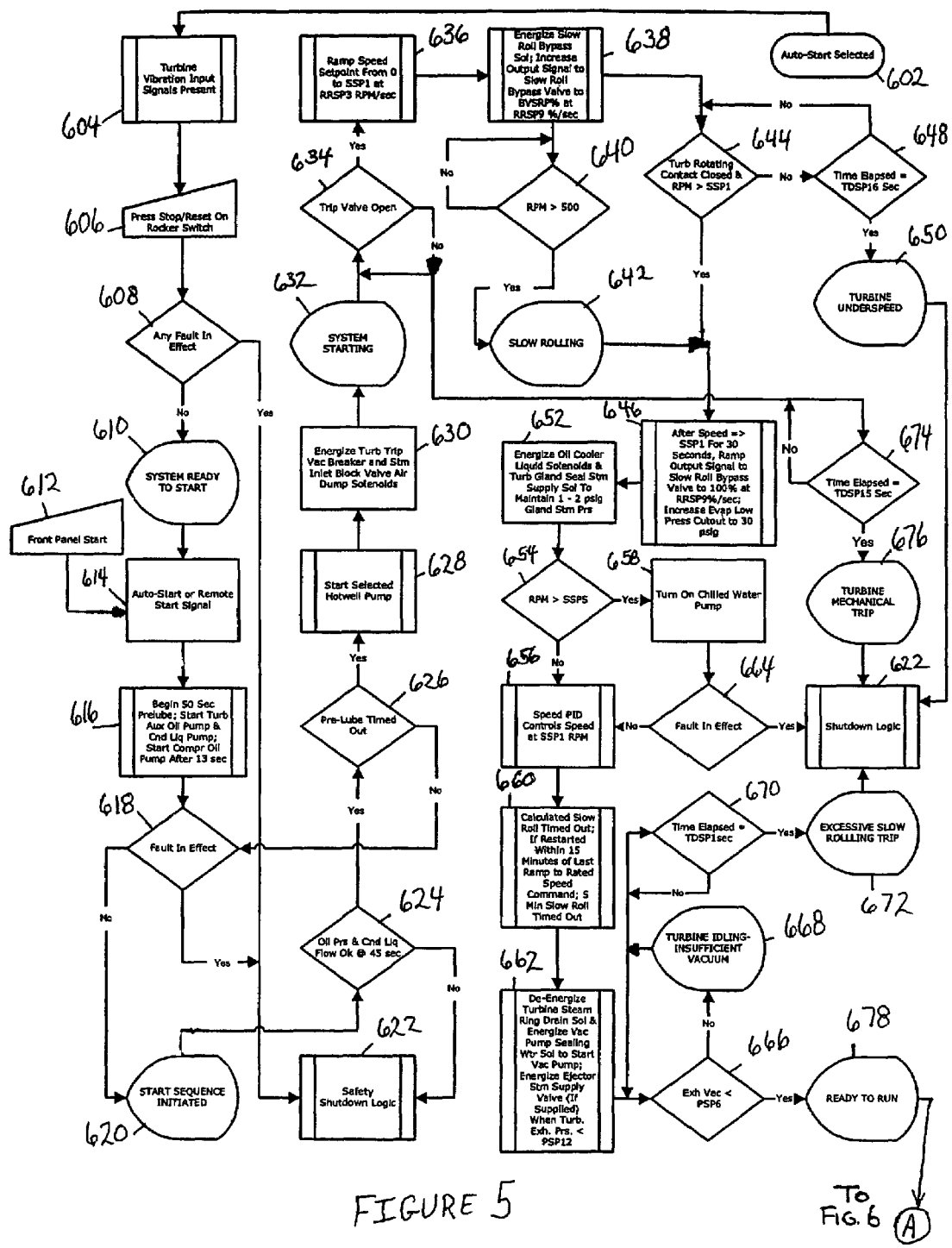
FIGS. 5 and 6 are a schematic representation of a portion of the startup control logic of the present invention.
Figure 6:
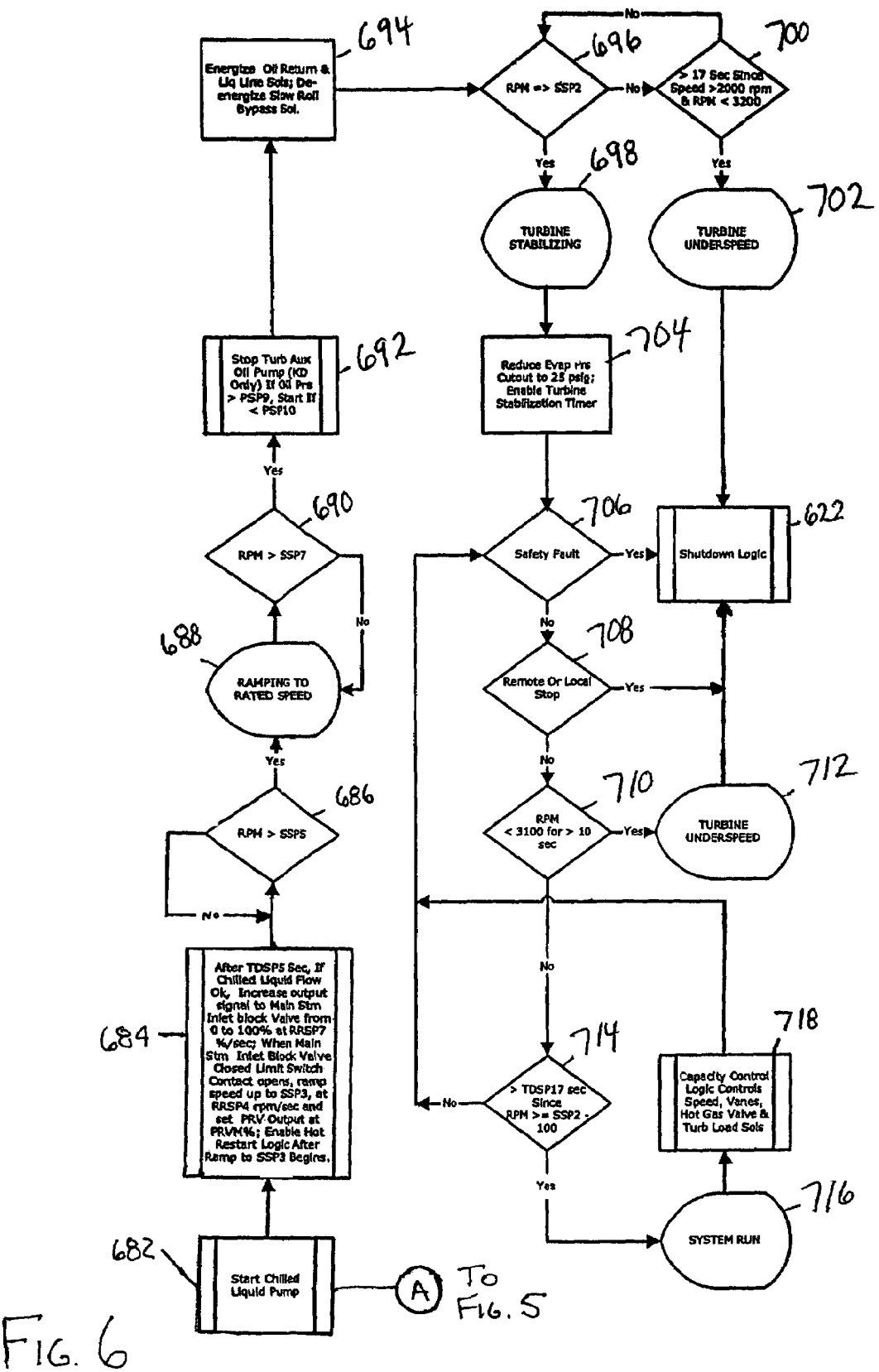

FIGS. 5 and 6 illustrate an embodiment of an automatic startup process for the startup control program of the present invention. In block 602, an operator selects an automatic start mode for the chiller system 10. In block 604, turbine vibration monitors are checked for the presence of input signals greater than 2 mA. If all turbine vibration monitor input signals are greater than 2 mA, the chiller system 10 may be automatically started either locally at the control panel 90 or remotely via a digital signal from a plant control system. Otherwise, the chiller system 10 has to be manually started using a manual startup process. Next, in block 606, the operator manipulates a switch to reset any previous safety trips. The operator manipulation of the switch to reset any previous safety trips in block 606 is necessary to enable remote starting if the chiller system 10 had not been previously started, or if the chiller system 10 had been shutdown by a safety trip. In another embodiment, not requiring remote starting, any previous safety trips can be automatically reset by the startup control program.

In block 608, a self-diagnostic check is executed to determine if any fault conditions are present. As an example, a fault condition may be caused by a reading from a sensor that is outside the expected range of values indicating a normal startup condition. If no fault conditions are detected in step 608, the control logic continues to block 610. However, if a fault condition is detected, the logic proceeds to block 622. In block 610, the user interface 94 displays a message "System Ready to Start" or other similar indication, and the logic proceeds to block 614.

In block 614, controller 90 initiates the automatic start or startup process for chiller 10 in response to the receipt of a remote start signal (if enabled) or a local start signal as set forth in block 612. In block 612, the operator can begin the automatic start process for the chiller system 10 by entering or inputting a start command into the user interface 94 or by selecting a "Start" key, button, switch or option on the control panel 90. After the automatic start process has been initiated in block 614, the logic proceeds to block 616.

In block 616, a pre-lubrication of compressor 12 and steam turbine 14 is started for a predetermined pre-lubrication time period, e.g., 50 seconds, by starting a turbine auxiliary oil pump and a condenser water pump. In addition, a compressor oil pump is started after a predetermined oil pump time delay, e.g., 13 seconds. The startup control program logic then proceeds to block 618. In block 618, another self-diagnostic check is performed, similar to the self-diagnostic check of block 608. If there is no detected fault condition, the control logic proceeds to block 620. However, if a fault condition is detected, the logic proceeds to block 622. In block 622, safety shutdown logic is initiated where parameters that were identified as a fault condition may be recorded in a retrievable memory for future diagnostics.

In block 620, the user interface 94 can display the message "Start Sequence Initiated", and the logic proceeds to block 624. In block 624, a determination is made as to whether adequate oil pressures and condenser water flow have been established after a predetermined amount of time, e.g., 45 seconds, after the starting of the pumps in block 616. If adequate flows are determined to have been established, the logic proceeds to block 626. If adequate flows are determined to not have been established, the logic proceeds to block 622 for the initiation of the safety shutdown logic. In block 626, a determination is made as to whether the predetermined pre-lubrication time period started in block 616 has ended. If the determination of block 626 is positive, the control logic proceeds to block 628, if the determination is negative, the control logic returns to block 618 and proceeds as described above.

In block 628, a condensate, or hotwell pump 62 is started and the logic proceeds to block 630. Preferably, steam condenser 20 includes more than one hotwell pump 62, and the pump that was idle during the last chiller system 10 operation can be selectively started or the standby pump can be started if the lead pump fails to start. In block 630, a main steam inlet block valve air dump solenoid valve is energized to permit the main steam inlet block valve 69 to be automatically opened, a turbine trip solenoid valve and a vacuum breaker solenoid valve are energized, and the logic proceeds to block 632. In addition, a pneumatic turbine trip valve is opened during block 630.

In block 632, user interface 94 can display the message "System Starting", and the logic will proceed to block 634. In block 634, a determination is made as to whether the turbine trip valve is opened or the turbine trip valve limit switch is closed. If the turbine trip valve is open in block 634, the logic proceeds to block 636. However, if the turbine trip valve is closed in block 634, the logic returns to block 634 and proceeds to block 674. In block 674, a determination is made as to whether a first predetermined time period, TDSP15, e.g., 10 seconds, has elapsed since the open turbine trip valve command was given during block 630. If the determination in block 674 is positive, the logic proceeds to block 676. If the determination in block 674 is negative, the logic returns to blocks 634 and 674. In block 676, the user interface 94 can display the message "Turbine Mechanical Trip", and the logic proceeds to block 622 for the initiation of the safety shutdown logic.

In block 636, a desired speed, SSP1, for the slow roll of the steam turbine 14, and a desired acceleration, or speed ramp rate, RRSP3, to obtain the desired speed are selected. Preferably, RRSP3 is set at a first predetermined acceleration rate, e.g., 50 rpm/second, during initial steam turbine startup and SSP1 is set at a first predetermined turbine speed, e.g., 1000 rpm, although these desired values can be any appropriate values for the particular steam turbine 14 selected. In addition, the governor valve 48 is opened in response to an output signal at the governor valve transducer. In block 638, a slow roll bypass solenoid valve is energized and an output signal for a steam inlet slow roll bypass valve 68 is provided to automatically open the steam inlet slow roll bypass valve to a predetermined position at a predetermined ramp rate to admit steam to the steam turbine 14 and start a slow roll warm-up. The predetermined position for the steam inlet slow roll bypass valve corresponds to a position that results in the first predetermined turbine speed for slow rolling steam turbine 14, and can vary, depending upon inlet steam pressure. The logic then proceeds to blocks 640 and 644.

In block 640, a determination is made on whether the speed of the steam turbine 14 has increased above a first predetermined threshold speed, e.g., about 500 rpm. If the determination in block 640 is negative, the logic returns to block 640. If the determination in block 640 is positive, the logic proceeds to block 642. In block 642, user interface 94 can display the message "Slow Rolling", or other similar indication, and the logic proceeds to block 646. In block 644, a determination is made on whether steam turbine 14 is rotating at a speed greater than or equal to the first predetermined turbine speed, SSP1. If the determination of block 644 is positive, the logic proceeds to block 646. If the determination in block 644 is negative, the logic proceeds to block 648. In block 648, a determination is made as to whether a second predetermined time period, TDSP16, e.g., 100 seconds, has elapsed since the opening of the steam inlet slow roll bypass valve in block 638. If the determination in block 648 is negative, the logic proceeds to block 644. If the determination in block 648 is positive, the logic proceeds to blocks 650. In block 650, the user interface 94 can display the message "Turbine Underspeed", and the logic proceeds to block 622 for the initiation of the safety shutdown logic. In this manner, blocks 644 and 648 can shutdown steam turbine 14 if the first predetermined turbine speed, SSP1, is not achieved within the second predetermined time period, TDSP16, thereby preventing prolonged operations of steam turbine 14 at undesirable speeds.

In block 646, in response to the steam turbine 14 rotating at or above the first predetermined turbine speed, SSP1, for more than a predetermined amount of time, e.g. 30 seconds, the steam inlet slow roll bypass valve is automatically opened to a fully open position and the logic proceeds to block 652. In addition, the evaporator low pressure safety shutdown setpoint is then increased to a predetermined value, e.g. 30 psig. The evaporator low pressure safety shutdown setpoint is used to shutdown the chiller system 10 when the evaporator pressure decreases to below the setpoint value.

In block 652, oil cooler water solenoid valves are opened to permit the compressor and turbine oil temperature control valves to maintain the bearing oil temperatures at approximately 110 to 120° F. In addition, the turbine gland seal steam supply solenoid 67 is automatically energized to admit steam to the gland seal supply pressure regulating valve to maintain about 1 to about 2 psig steam pressure in the glands. The logic proceeds to block 654. In block 654, a determination is made as to whether the speed of steam turbine 14 has exceeded a second predetermined threshold speed, SSP5. Preferably, the second predetermined threshold speed, SSP5, is about 1200 rpm. If the determination in block 654 is negative, the logic proceeds to block 656. If the determination in block 654 is positive, the logic proceeds to block 658. In block 658, a chilled water pump is started, and the logic proceeds to block 664. In block 664, a determination is made if a fault condition is present based on the establishment of a chilled water flow. A fault condition is present in block 664, if adequate chilled water flow has not been established, and the logic proceeds to block 622 for the initiation of the safety shutdown logic. A fault condition is not present in block 664, if adequate chilled water flow has been established, and the logic proceeds to block 656.

If a determination in block 654 or block 664 is negative, the logic proceeds to block 656. In block 656, the speed of steam turbine 14 is maintained at about SSP1, and the logic proceeds to block 660. In block 660, a determination is made on whether the calculated slow rolling time has elapsed, and the logic proceeds to block 662. The minimum desired slow rolling time, SRT, (in minutes) is calculated as a function of the number of stages, Ns, of steam turbine 14 and the steam inlet temperature, Ti (° F.), using the following algorithm:

$$SRT = 20 + Ns + [(Ti - 350)/50]$$

An exemplary slow roll time calculation for a steam turbine with 7 stages with a steam inlet temperature of about 353° F. would yield a slow roll time of about 27 minutes. Alternately, an abbreviated slow roll time can be used, e.g., 5 minutes, if the present chiller start command from block 614 was initiated within a predetermined amount of time, e.g., 15 minutes, of a previous ramp to rated speed command. Preferably, the user interface 94 displays the remaining slow rolling time for operator notification.

In block 662, the vacuum pump 65 is started and the turbine steam ring drain solenoid 63 is de-energized, and the logic proceeds to block 666. With the turbine steam ring drain solenoid 63 closed, the vacuum pump 65 can evacuate the steam turbine 14 in preparation for increasing the speed of steam turbine 14 to a minimum rated speed. In block 666, a determination is made as to when the steam turbine exhaust pressure decreases below a predetermined setpoint pressure, PSP6. Preferably, PSP6 is about 5 psia, although PSP6 can be adjusted by the operator to any appropriate amount of vacuum. This vacuum is desirable within steam turbine 14 to ensure that an influx of steam to obtain an operational speed produces sufficient power to accelerate the turbine 14 rapidly through the critical speed range and maintain the speed above the minimum rated speed during stabilization. When the steam turbine exhaust pressure decreases below PSP6, the logic proceeds to block 678. If the steam turbine exhaust pressure is greater than the predetermined setpoint pressure, PSP6, the logic proceeds to block 668. In block 668, user interface 94 displays the message "Turbine Idling—Insufficient Vacuum", and the logic returns to block 666 for monitoring of the turbine vacuum and also proceeds to block 670.

In block 670, a determination is made as to whether a predetermined time period, TDSP1, has elapsed since the expiration of the slow rolling time in block 660. Preferably, the predetermined time period, TDSP1, is determined from manufacturer's data on maximum desirable slow rolling times. If the determination in block 670 is negative, the logic proceeds to blocks 666 and 670. If the determination in block 670 is positive, the logic proceeds to blocks 672. In block 672, the user interface 94 can display the message "Excessive Slow Rolling Trip", and the logic proceeds to block 622 for the initiation of the safety shutdown logic.

In block 678, the user interface 94 displays the message "Ready to Run", and the logic will proceed to block 682. In block 682, the chilled water pump is started if it was not started previously in block 658, and the logic proceeds to block 684. In block 684, the presence of the minimum flow of chilled water through the evaporator 18 is confirmed after a predetermined time delay, TDSP5, e.g., 10 seconds. When the chilled water flow rate is confirmed, the main steam inlet block valve 69 is automatically opened to a fully open position at a predetermined ramp rate, RRSP7. Preferably, RRSP7 is set at 5%/sec, although this value can adjusted to any other appropriate value. In addition, when the main steam inlet block valve closed limit switch contacts open, indicating that the main steam inlet block valve is opening, the speed of steam turbine 14 is increased at a second predetermined acceleration rate, RRSP4, to a second predetermined turbine speed, SSP3. Preferably, SSP3 is 4200 rpm and RRSP4 is 100 rpm/second. This can be accomplished by sending a control signal to the governor valve 48 to rapidly open the governor valve 48. Furthermore, the pre-rotation vanes 80 are positioned at a predetermined minimum position. The logic can then proceed to block 686.

In block 686, a determination is made as to whether the speed of steam turbine 14 is greater than the second predetermined threshold speed, SSP5. If the speed of steam turbine 14 is greater than SSP5, the logic proceeds to block 688. If the speed of steam turbine 14 is not greater than SSP5, the logic returns to block 686.

In block 688, user interface 94 can display the message "Ramping to Rated Speed", and the logic will proceed to block 690. In block 690, it is determined whether the speed of steam turbine 14 is greater than a third predetermined threshold speed, SSP7. If the speed of steam turbine 14 is greater than SSP7, the logic proceeds to block 692. If the speed of steam turbine 14 is not greater than SSP7, the logic returns to block 688. Preferably, SSP7 is preselected to be about 3000 rpm, or at a similar speed in which the shaft driven turbine oil pump produces sufficient pressure for lubrication without the steam turbine auxiliary oil pump.

In block 692, the steam turbine auxiliary oil pump is stopped and the logic proceeds to block 694. In block 694, the oil return and liquid line solenoids are energized and the logic proceeds to block 696. In addition, the slow roll bypass solenoid is de-energized in block 694. In block 696, a determination is made as to whether the speed of steam turbine 14 is greater than or equal to a predetermined minimum rated speed, SSP2, for the turbine 14 and compressor 12 combination. Preferably, SSP2 is about 3200 rpm and is based on the specific steam turbine 14 and compressor 12 used in the chiller system 10, and stored into control panel 90. If the determination in block 696 is positive, the logic proceeds to block 698. If the determination in block 696 is negative, the logic proceeds to block 700.

In block 700, a determination is made as to whether the steam turbine 14 has been operating between about 2000 rpm and SSP2 for more than about 17 seconds. If the determination in block 700 is positive, the logic proceeds to block 702. In block 702, user interface 94 can display the message "Turbine Underspeed", and the logic will proceed to block 622 for the initiation of the safety shutdown logic. If the determination in block 700 is negative, the logic returns to block 696. In this manner, the steam turbine 14 and compressor 12 can be brought up to a predetermined rated speed, SSP2, within a desired amount of time, thereby preventing damage associated with prolonged operations in a critical speed range which is less than the minimum rated speed. It is to be understood that the desired minimum time of operation between 2000 rpm and SSP2, of about 17 seconds, is stored in control panel 90 to ensure this critical safety logic remains active.

In block 698, user interface 94 can display the message "Turbine Stabilizing" to indicate that the predetermined minimum rated speed, SSP2, has been obtained, and the logic will proceed to block 704. In block 704, the evaporator low pressure safety shutdown setpoint is then decreased to 25 psig. In addition, in block 704, a turbine stabilization timer is started. Thereafter, the logic proceeds to block 706. In block 706, a self diagnostic check is performed to detect for any safety faults. If the determination in block 706 is positive, i.e., a safety fault is present, the control logic proceeds to block 622 for the initiation of the safety shutdown logic. If the determination in block 706 is negative, i.e., a safety fault is not present, the control logic proceeds to block 708. In block 708, a determination is made on whether a stop command has been entered remotely or locally into the control panel 92. If the determination in block 708 is positive, i.e., a stop command has been entered, the logic proceeds to block 622 to initiate a shutdown of chiller system 10. If the determination in block 708 is negative, i.e., a stop command has not been entered, the logic proceeds to block 710.

In block 710, a determination is made as to when the speed of steam turbine 14 is less than a predetermined speed of about 3100 rpm for greater than a predetermined time of about 10 seconds. If the determination in block 710 is positive, the logic proceeds to block 712 wherein the user interface 94 can display the message "Turbine Underspeed", and the logic will proceed to block 622 for the initiation of the safety shutdown logic. If the determination in block 710 is negative, the logic proceeds to block 714.

In block 714, a determination is made as to when the speed of steam turbine 14 has been above (SSP2−100) rpm (about 3100 rpm) for greater than a second predetermined time period, TDSP17. Preferably, TDSP17 is about 120 seconds, or about 2 minutes. If the determination in block 714 is positive, the logic proceeds to block 716. If the determination in block 714 is negative, the logic returns to block 706. This delay of TDSP17 seconds in block 714 permits the steam turbine speed to stabilize well above the critical speed range of the steam turbine 14 before loading the chiller. It is to be understood that while TDSP17 is preferably 120 seconds, TDSP17 can be set or programmed to any suitable timeframe that provides for steam turbine stabilization upon startup. In block 716, user interface 94 can display the message "System Running" to indicate that the minimum rated speed has been obtained, and the logic will proceed to block 718.

In block 718, automatic control over the capacity of chiller 10 is initiated, and the logic will return to block 704 for continuous monitoring of a safety fault, stop command and turbine underspeed condition. The capacity control logic of the control panel 90 can increase, or decrease, the speed of steam turbine 14 to a desired speed, based upon chiller 10 system demand.

Figure 7:
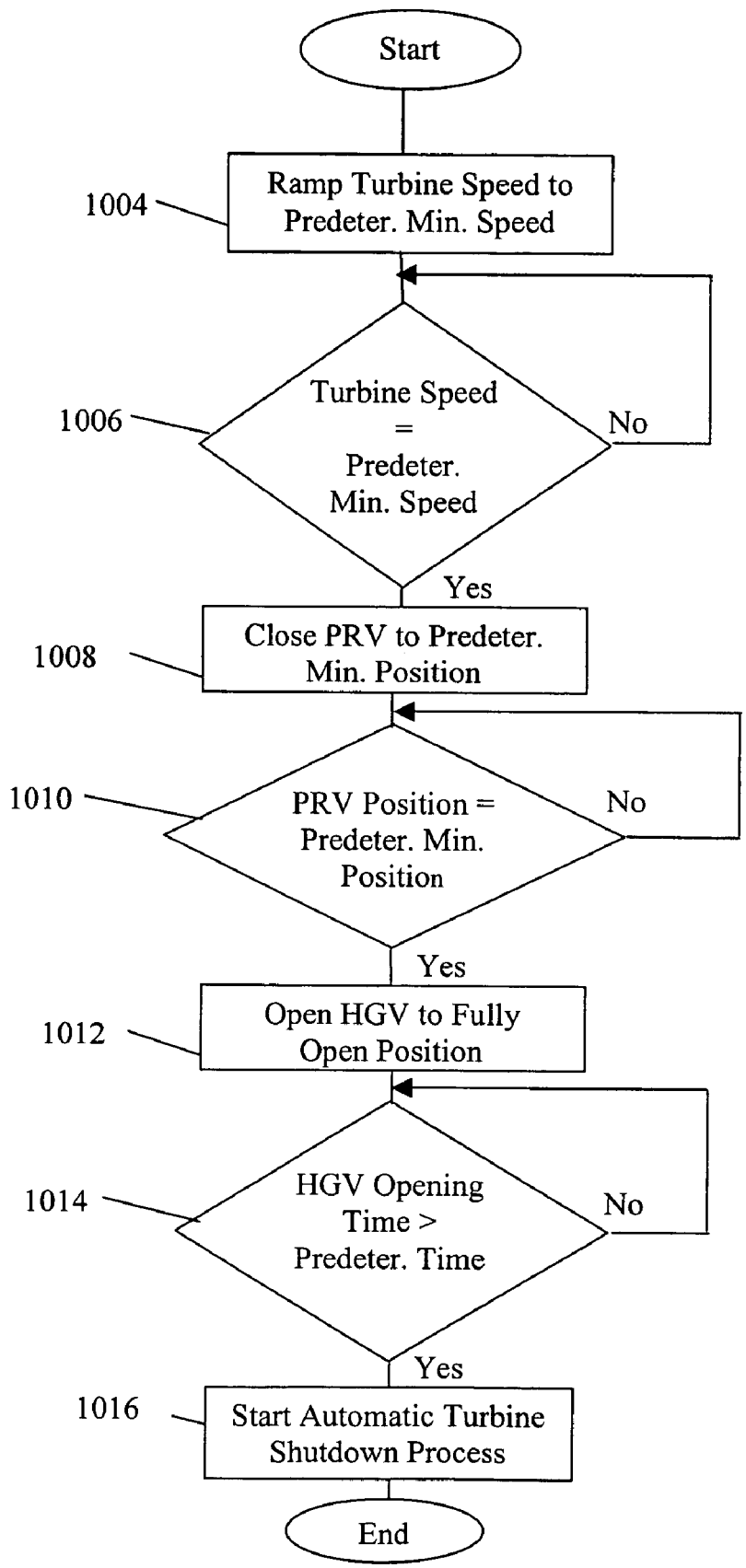
FIG. 7 is a flowchart of an embodiment of a shutdown process for the present invention.

The central control algorithm executed by the microprocessor 96 on the control panel 90 also preferably includes a shutdown control program or algorithm to automatically control the shutdown of the steam turbine 14 and compressor 12 in response to receiving a shutdown command from an operator. FIG. 7 illustrates an embodiment of the automatic shutdown process of the present invention. The shutdown process begins at step 1004, with the speed of the steam turbine 14 being ramped down or decreased to a predetermined minimum turbine speed. The user interface 94 can then display the message "System Shutting Down-Speed Decreasing" to the operator. In a preferred embodiment, the predetermined minimum turbine speed is the calculated anti-surge minimum speed for the steam turbine 14. The speed of the steam turbine 14 is evaluated in step 1006 to determine if it is equal to the predetermined minimum turbine speed. If the speed of the steam turbine 14 is equal to the predetermined minimum turbine speed, then the process proceeds to step 1008. Otherwise, the speed of the steam turbine 14 is further decreased or ramped down in step 1004.

In step 1008, the pre-rotation vanes (PRV) 80 are closed to a predetermined minimum vane position in response to the turbine speed being equal to the predetermined minimum turbine speed. In a preferred embodiment, the predetermined minimum vane position is the calculated anti-surge minimum vane position for the pre-rotation vanes 80. The user interface 94 can then display the message "System Shutting Down-Vanes Closing" to the operator. The position of the pre-rotation vanes 80 is then evaluated in step 1010 to determine if it is equal to the predetermined minimum vane position. If the position of the pre-rotation vanes 80 is equal to the predetermined minimum vane position, then process proceeds to step 1012. Otherwise, the pre-rotation vanes 80 are further closed in step 1008.

In addition, while the pre-rotation vanes 80 are closing in step 1008, the system head or system pressure differential is also decreasing as a result of the closure of the pre-rotation vanes 80. The lower system pressure differential can result in a lower value for the predetermined minimum turbine speed and, preferably, in a lower calculated anti-surge minimum speed for steam turbine 14. In a preferred embodiment, while the pre-rotation vanes 80 are closing in step 1008, the speed of the steam turbine 14 is also being decreased, as set forth in step 1004, in response to the reduction in the predetermined minimum turbine speed resulting from the reduction in system pressure differential.

In step 1012, the hot gas bypass valve (HGV) 84 is opened to a fully open position (100%) in response to the position of the pre-rotation vanes 80 being equal to the predetermined minimum vane position. In addition, while the hot gas bypass valve 84 is opening in step 1012, the system head or system pressure differential is decreasing as a result of the opening of the hot gas bypass valve 84. The lower system pressure differential can result in a lower value for the predetermined minimum turbine speed and, preferably, in a lower calculated anti-surge minimum speed for steam turbine 14. Also, the lower system pressure differential can result in a lower value for the predetermined minimum vane position and, preferably, in a lower calculated anti-surge minimum vane position. In a preferred embodiment, while the hot gas bypass valve 84 is opening in step 1012, resulting in a reduction in system pressure differential, the speed of the steam turbine 14 is also being decreased, as set forth in step 1004, in response to the reduction in the predetermined minimum turbine speed and the pre-rotation vanes are closing, as set forth in step 1008, in response to the reduction in the predetermined minimum vane position.

In step 1014 a determination is made on whether the hot gas bypass valve 84 has been opening, as set forth in step 1012, for more than a predetermined time period. The position of the hot gas bypass valve 84 does not impact the determination in step 1014 and the hot gas bypass valve 84 may not be in the fully opened position upon a determination that the hot gas bypass valve has been opening for more than the predetermined time period. The predetermined time period can be between about 1 minute and about 5 minutes and is preferably about 3 minutes. If the predetermined time period has elapsed, indicating that the hot gas bypass valve 84 has been opening for more than the predetermined time period, the control proceeds to step 1016. Otherwise, the hot gas bypass valve 84 is further opened in step 1012. In step 1016, the turbine shutdown process is initiated to automatically shutdown the steam turbine 14 and the chiller system 10.

In one embodiment of the present invention, the automatic steam turbine system shutdown or trip process from step 1016 of FIG. 7 begins with the de-energizing of the main system run relay in response to the initiation of the automatic turbine trip or shutdown process. The de-energizing of the main system run relay causes the de-energizing of a turbine trip solenoid, which causes a pneumatic turbine trip valve to close. The compressor pre-rotation vanes 80 are closed and the hot gas bypass valve 84 and a subcooler level control valve are opened. In addition, the main steam inlet block valve air dump solenoid valve is de-energized to automatically close the automatic main steam inlet block valve 69. The vacuum pump 65 is stopped and the vacuum breaker solenoid valve is opened to break the vacuum in the exhaust line and more quickly slow the speed of the steam turbine 14. Furthermore, the control output signals to the automatic main steam inlet block valve 69 and automatic steam inlet slow roll bypass valve 68 are set to 0%. The speed control set point for the steam turbine 14 is set to 0 RPM which causes the control output signal to the governor valve 48 to decrease to 0% and close the governor valve 48.

Next, when the speed of the steam turbine 14 decreases below 3000 RPM, the oil return and liquid line solenoid valves are deenergized and a turbine auxiliary oil pump is started. During the coast down of the drive train between the steam turbine 14 and the compressor 12, the compressor oil pump and turbine auxiliary oil pump can continue to operate to maintain lubrication of the corresponding compressor and turbine bearings and a message "System Coastdown" can be displayed on user interface 94. Once the rotation of the drive train has stopped the message "Compressor Shutdown; Turbine Cooldown" can be displayed on user interface 94. The turbine gland seal steam supply solenoid 67 is de-energized to automatically shut off the steam supply to the gland seal supply pressure regulating valve.

After no rotation has been detected for about 20-50 seconds, the compressor oil pump can stop and the chilled water pump contacts are opened to stop the chilled water pump. The turbine auxiliary oil pump can continue to run for about 20-40 minutes to remove excess heat from the turbine bearings. About 5-7 minutes after tripping the steam turbine 14, if no rotation is detected, the condenser water and hotwell pumps 44 are stopped and the oil cooler water solenoid valves are de-energized. The turbine steam ring drain solenoid is energized to automatically drain any condensate out of the casing as the turbine cools down. Finally, about 25-35 minutes after the rotation has stopped, the turbine auxiliary lube oil pump will be stopped and the message "System Ready To Start" can be displayed on the user interface 94.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of automatically starting a steam turbine driven chiller system in response to entry of a single command by an operator, the method comprising the steps of:
    executing a steam turbine start sequence;
    executing a steam turbine slow roll mode operation, wherein executing a steam turbine slow roll operation comprises:
        calculating a slow roll time period for the slow roll mode operation, wherein the slow roll time period is dependent upon a number of stages of the steam turbine and an inlet steam temperature to the steam turbine; and
        evacuating the steam turbine exhaust to a desired vacuum in response to the slow roll time period expiring;
    executing a steam turbine acceleration process to accelerate the steam turbine to an operational speed; and
    wherein the steps of executing a steam turbine start sequence, executing a steam turbine slow roll mode operation, and executing a steam turbine acceleration process are completed by a control program without additional action by an operator.

2. The method of claim 1 wherein the step of executing a steam turbine slow roll mode operation includes opening a steam inlet slow roll bypass valve to a predetermined position with the control program to permit a predetermined amount of steam to enter the steam turbine.

3. The method of claim 2 wherein the step of executing a steam turbine acceleration process includes opening the steam inlet slow roll bypass valve to a second predetermined position with the control program, the second predetermined position being different from the predetermined position.

4. The method of claim 3 wherein the second predetermined position is a fully open position.

5. The method of claim 3 wherein the step of executing a steam turbine acceleration process further includes the steps of:
    monitoring a speed of the steam turbine;
    comparing the monitored speed of the steam turbine to a predetermined threshold speed; and
    closing the steam inlet slow roll bypass valve with the control program in response to the speed of the steam turbine being greater than the predetermined threshold speed.

6. The method of claim 5 wherein the predetermined threshold speed is about 3000 rpm.

7. The method of claim 1 wherein the step of evacuating the steam turbine exhaust includes the steps of:
    starting a vacuum pump, the vacuum pump being configured to reduce a steam turbine outlet pressure; and
    closing a turbine steam ring drain valve with the control program, the turbine steam ring drain valve being configured to permit condensate to drain from the steam turbine upon being in an open position.

8. The method of claim 1 wherein the step of executing the steam turbine acceleration process includes increasing the speed of the steam turbine from a preselected starting speed to the operational speed.

9. The method of claim 8 wherein the step of executing the steam turbine acceleration process further includes the steps of:
    monitoring a speed of the steam turbine;
    comparing the monitored speed of the steam turbine to a predetermined threshold speed; and
    shutting down the steam turbine in response to the speed of the steam turbine being less than the predetermined threshold speed for a predetermined amount of time.

10. The method of claim 9 wherein the predetermined threshold speed is the operational speed, the predetermined amount of time is about 17 seconds, and the preselected starting speed is about 2000 rpm.

11. The method of claim 8 wherein the step of executing the steam turbine acceleration process further includes the steps of:
monitoring a speed of the steam turbine in response to the speed of the steam turbine exceeding the operational speed;
comparing the monitored speed of the steam turbine to a predetermined threshold speed; and
shutting down the steam turbine in response to the speed of the steam turbine being less than the predetermined threshold speed for a predetermined amount of time.

12. The method of claim 11 wherein the predetermined amount of time is about 10 seconds, and the predetermined threshold speed is the operational speed minus about 100 rpm.

13. The method of claim 8 further comprising the step of opening a main steam inlet block valve with the control program to increase the speed of the steam turbine.

14. The method of claim 1 further comprising the step of displaying messages to the operator indicating a current status of the chiller system.

15. The method of claim 1 further comprising the steps of:
verifying that a speed of the steam turbine is greater than a predetermined threshold speed for a predetermined amount of time upon completion of the steam turbine acceleration process; and
executing capacity control logic in response to the speed of the steam turbine being greater than the predetermined threshold speed for the predetermined amount of time.

16. The method of claim 15 wherein the predetermined threshold speed is the operational speed minus about 100 rpm and the predetermined amount of time is about 120 seconds.

17. The method of claim 1 wherein the entry of the single command by the operator being provided at a position located at one of remotely from the steam turbine driven chiller system and locally to the steam turbine driven chiller system.

18. A method of automatically starting a steam turbine driven chiller system in response to entry of a single command by an operator, the method comprising the steps of:
executing a steam turbine start sequence, wherein executing a steam turbine start sequence comprises:
performing a steam turbine vibration sensor verification;
initiating a pre-lubrication of the steam turbine and a compressor of the chiller system;
selecting a hotwell pump from a plurality of hotwell pumps for operation; and
starting the selected hotwell pump upon completion of the pre-lubrication of the steam turbine and the compressor;
executing a steam turbine slow roll mode operation;
executing a steam turbine acceleration process to accelerate the steam turbine to an operational speed; and
wherein the steps of executing a steam turbine start sequence, executing a steam turbine slow roll mode operation, and executing a steam turbine acceleration process are completed by a control program without additional action by an operator.

19. The method of claim 18 wherein the step of executing the steam turbine start sequence includes opening a main steam inlet block valve to a predetermined position with the control program.

20. The method of claim 19 wherein the step of executing a steam turbine acceleration process includes opening the main steam inlet block valve to a second predetermined position with the control program, the second predetermined position being different from the predetermined position.

21. The method of claim 20 wherein the second predetermined position is a fully open position.

* * * * *